United States Patent
Hsieh

(10) Patent No.: US 8,674,222 B2
(45) Date of Patent: Mar. 18, 2014

(54) GUIDING AND PROTECTING DEVICE FOR CABLE AND CONDUIT

(75) Inventor: Shu-Li Hsieh, New Taipei (TW)

(73) Assignee: Kang Yang Hardware Enterprises Co., Ltd., New Taipei (TW)

( * ) Notice: Subject to any disclaimer, the term of this patent is extended or adjusted under 35 U.S.C. 154(b) by 120 days.

(21) Appl. No.: 13/421,475

(22) Filed: Mar. 15, 2012

(65) Prior Publication Data
US 2013/0161453 A1   Jun. 27, 2013

(30) Foreign Application Priority Data
Dec. 26, 2011   (TW) .............................. 100224510 U

(51) Int. Cl.
*H02G 3/04* (2006.01)
(52) U.S. Cl.
CPC .................................. *H02G 3/0475* (2013.01)
USPC ........................................ 174/68.1; 174/68.2
(58) Field of Classification Search
USPC ..................... 174/19, 68.1–68.3, 95, 97, 101; 59/78.1, 83, 85; 248/49, 51
See application file for complete search history.

(56) References Cited

U.S. PATENT DOCUMENTS

| | | | | |
|---|---|---|---|---|
| 6,161,373 A | * | 12/2000 | Heidrich et al. | 59/78.1 |
| 2005/0198937 A1 | * | 9/2005 | Komiya | 59/78.1 |
| 2011/0173946 A1 | * | 7/2011 | Yamashita | 59/78.1 |
| 2013/0075128 A1 | * | 3/2013 | Kaihotsu et al. | 174/68.3 |
| 2013/0219852 A1 | * | 8/2013 | Komiya | 59/78.1 |

* cited by examiner

*Primary Examiner* — Yuriy Semenenko
(74) *Attorney, Agent, or Firm* — Guice Patents PLLC

(57) ABSTRACT

The present invention relates to a guiding and protecting device for a cable and conduit, comprising a pair of lateral walls being connected through a bottom plate, wherein the top surface of one of the lateral walls is connected to an end of one of a lateral edges of a restrain plate integrally, the other lateral edge is downwardly extended with a bending part, a buckle mechanism is formed between the bending part and the other lateral wall; an opened top of an accommodation slot formed by the two lateral walls is sealed by the restrain plate, and the two lateral edges of the restrain plate are respectively abutted against an inner edges of a positioning blocks protrudingly formed on the top surfaces of the two lateral walls, thereby overcoming the disadvantage of the two lateral walls being inwardly retracted and deformed, meanwhile increasing the whole structural strength.

10 Claims, 5 Drawing Sheets

A-A

B-B

US 8,674,222 B2

GUIDING AND PROTECTING DEVICE FOR CABLE AND CONDUIT

BACKGROUND OF THE INVENTION

1. Field of the Invention

The present invention relates to a guiding and protection device, especially to a guiding and protecting device capable of guiding and protecting a cable or conduit.

2. Description of Related Art

A guiding and protecting device is commonly used in an automation moveable component, e.g. a mechanical arm of a machine, thereby preventing the flexible cable or conduit from tangling with each other.

In a conventional guiding and protecting device, the front and the rear of two lateral walls of a frame having an opened top are respectively and oppositely installed with a pair of pivot shafts and a pair of shaft holes; when being assembled, the pair of pivot shafts installed at the front of a guiding and protecting device are inserted into the pair of shaft holes formed at the rear of an adjacent guiding and protecting device, thereby forming a bendable guide chain; meanwhile a limitation mechanism is provided at the connection location defined by the pivot shafts and the shaft holes of the two guiding and protecting devices for limiting the bending angle of the two guiding and protecting devices; and the opened top of the two lateral walls of the frame is transversally installed with a restrain plate for preventing the cable or conduit accommodated in an accommodation slot of the frame from falling out, thereby achieving the objectives of guiding and protecting the cable or conduit.

One major disadvantage of the guiding and protecting device is that the guiding and protecting device is formed through plastic injection molding, such formation means would cause the two lateral walls to slightly and inwardly retract after the plastic material of which the two lateral walls are made being cooled, thereby affecting the buckling and positioning of the restrain plate. When the lateral walls of the guiding and protecting device formed as an elongated guide chain are in contact with the moveable component, the lateral walls may be deformed due to an external force, and the buckle mechanism of the restrain plate and the lateral walls is loosened so the restrain plate is released, therefore the cable or conduit accommodated in the accommodation slot formed between the two lateral walls of the frame is fallen out. As such, the skilled people in the art attempt to add glass fibers in the plastic material with a hope of reinforcing the whole strength of the guiding and protecting device, thereby decreasing the occurrence of the inward-retracted deformation after injection molding and the insufficient structural strength; however, the solution would increase the hardness of the restrain plate which would generate the disadvantages of easily to be broken or loosened and not being reusable, so the cable or conduit has to be inserted into the accommodation slot of the frame under a circumstance of the restrain plate being in a transversal connection state; however, the insertion process of the cable or conduit is not easy to be processed because any two adjacent guiding and protecting devices of the elongated guide chain are not remained in a vertical state, therefore the disadvantage shall be improved.

SUMMARY OF THE INVENTION

One primary objective of the present invention is to provide a guiding and protecting device for a cable or conduit, so during the buckle process, an abutting connection can be formed between a restrain plate and a pair of positioning blocks preformed on the top surfaces of two lateral walls, thereby overcoming the disadvantage of the two lateral walls being inwardly retracted and deformed, meanwhile the whole structural strength is increased for preventing the buckle mechanism formed by the restrain plate and the lateral walls from being loosened.

For achieving the objective, one solution provided by the present invention is to provide a guiding and protecting device for a cable or conduit, which comprises:

a pair of lateral walls, the bottoms thereof are connected through a bottom plate thereby defining an accommodation slot having an opened top between the two lateral walls and the bottom plate, outer sides of the front portion and the rear portion of each lateral wall are in sequence installed with a first recessed part having a width half of the width of the lateral wall, a first pivot plate, a second pivot plate and a second recessed part; wherein an arc-shaped connection edge is defined by each first recessed part and the rear portion of the lateral wall thereby allowing to be adjacent to an arc-shaped flange formed at the rear portion of the second pivot plate, each first pivot plate is radially and protrudingly extended with a pivot shaft, and each second pivot plate is radially formed with a shaft hole allowing the pivot shaft to be inserted, and at least one side of the top surfaces of the pair of lateral walls are oppositely and protrudingly installed with a pair of positioning blocks; and a restrain plate having two lateral edges, wherein an end of one of the lateral edges is integrally connected to the top surface of one of the lateral walls through a neck plate, the other lateral edge is downwardly extended with a bending part, a buckle mechanism is formed between the bending part and the other lateral wall, when the buckling is finished, the two lateral edges of the restrain plate are respectively abutted against the inner edges of the positioning blocks protrudingly formed on the top surfaces of the two lateral walls, and the opened top of the accommodation slot is sealed by the restrain plate.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
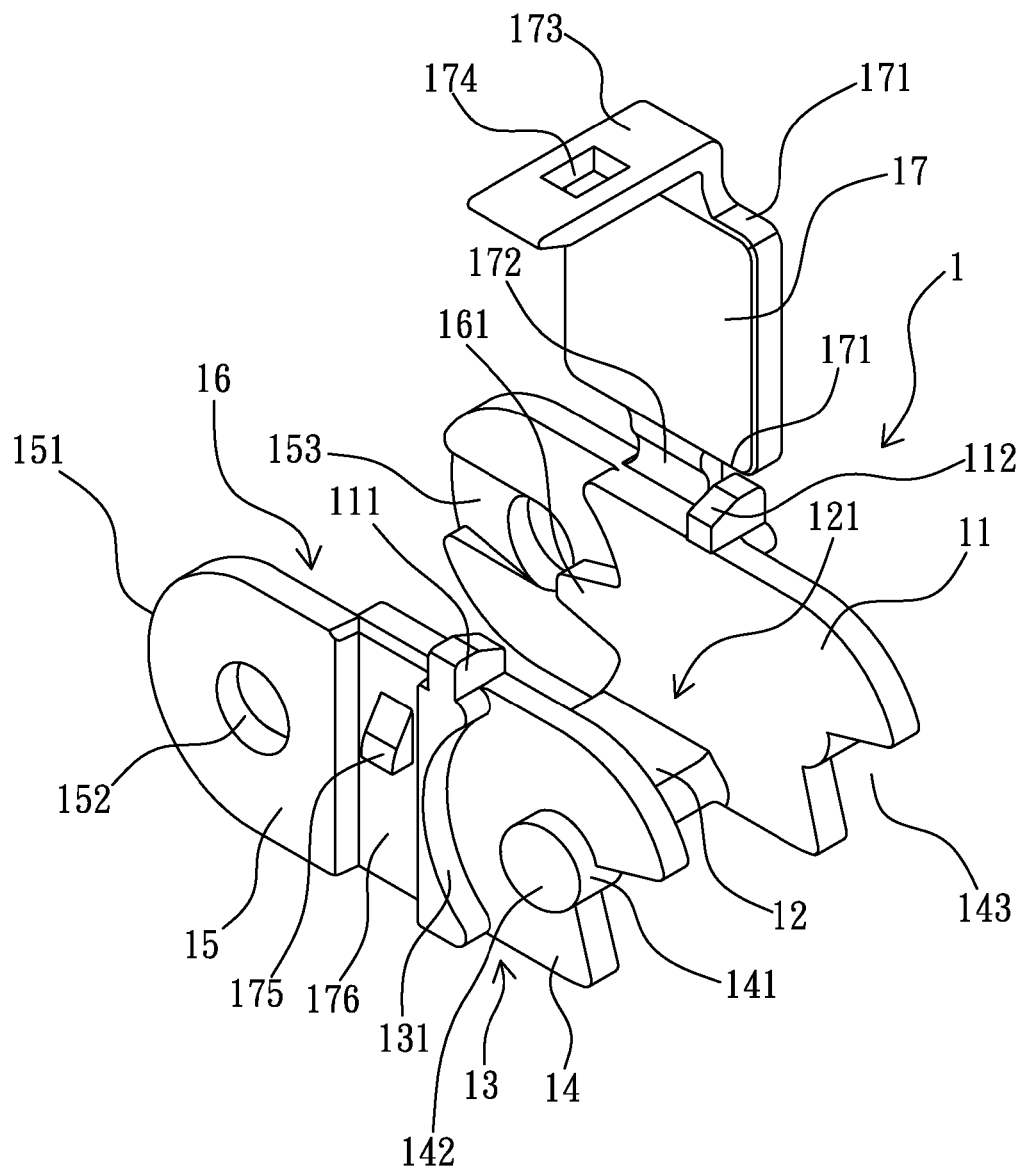
FIG. 1 is a perspective exploded view showing the guiding and protecting device being viewed from one angle, according to the present invention.
Figure 2:
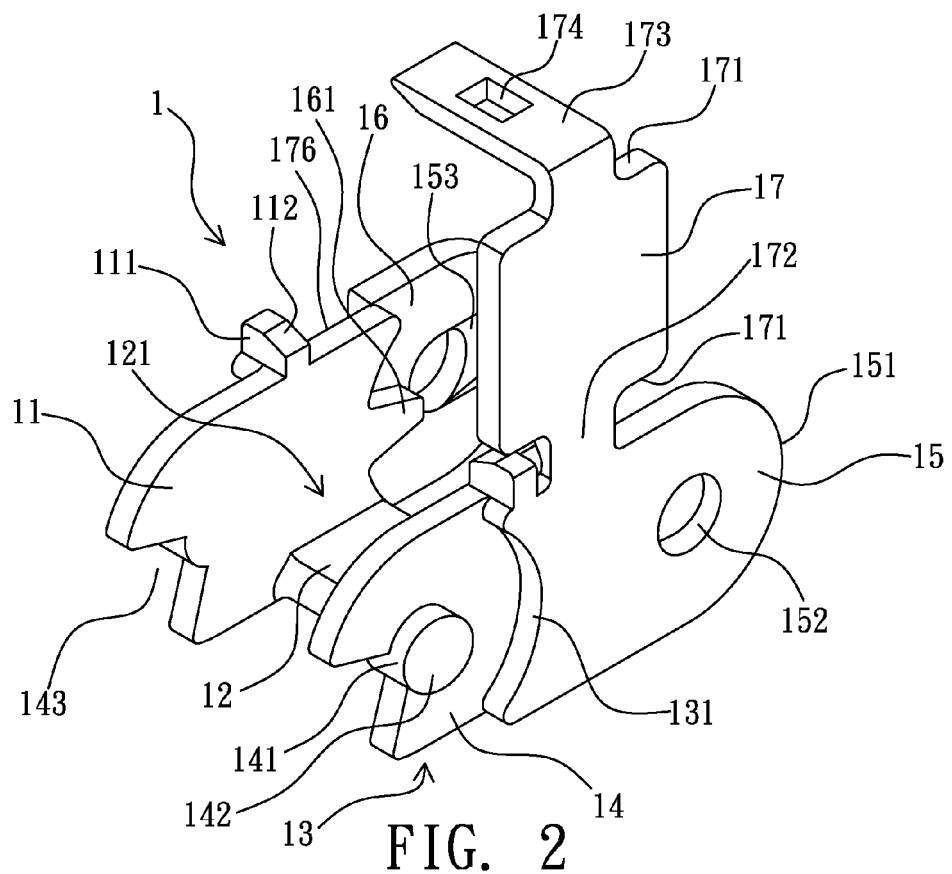
FIG. 2 is a perspective exploded view showing the guiding and protecting device being viewed from another angle, according to the present invention.
Figure 3:
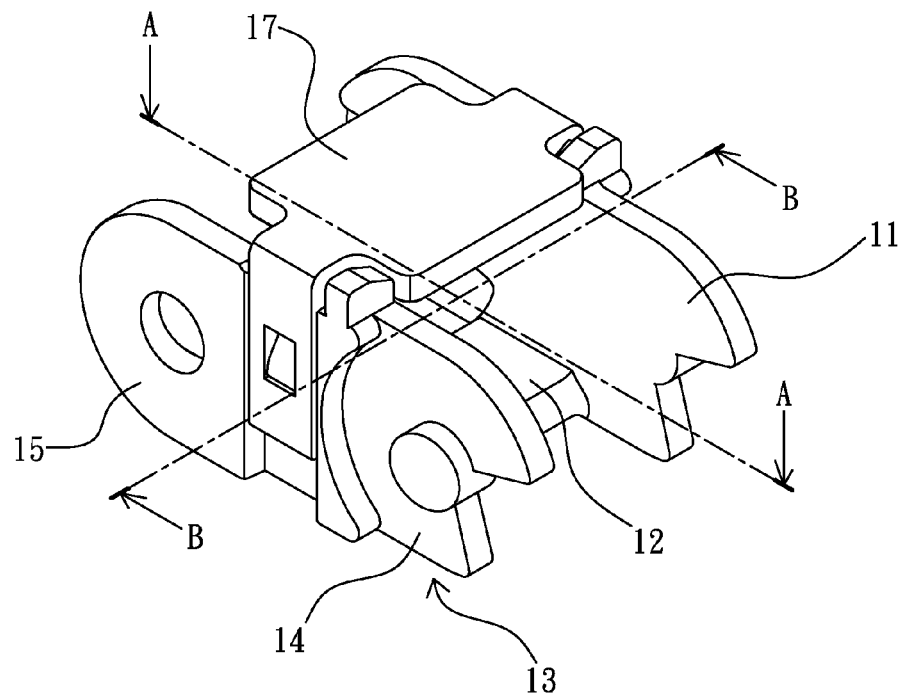
FIG. 3 is a schematic perspective view illustrating the restrain plate of the guiding and protecting device being buckled, according to the present invention.
Figure 4A:
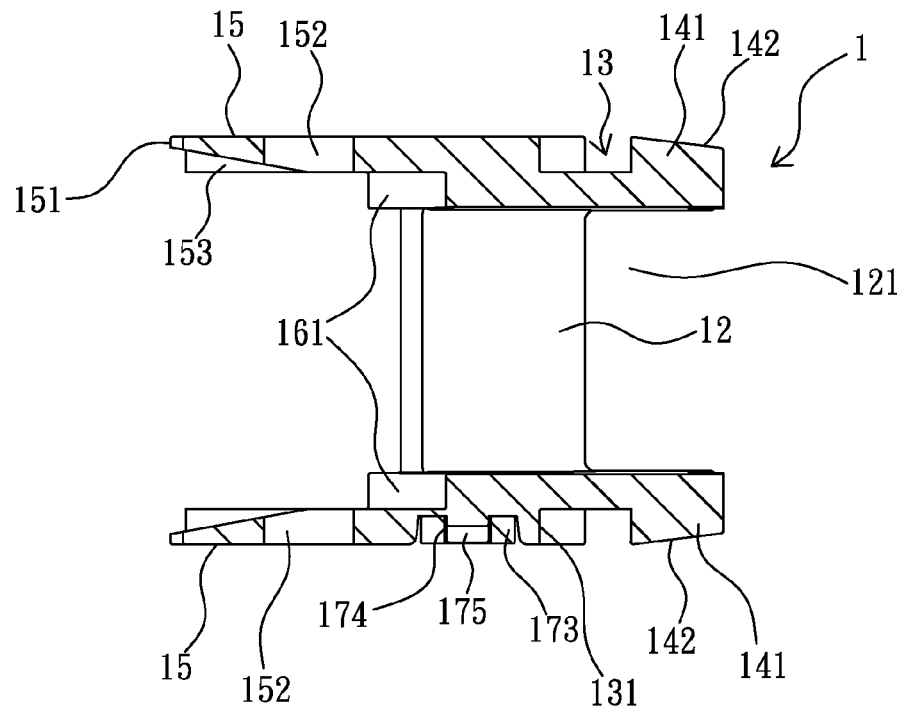
FIG. 4a is a cross sectional view of FIG. 3 taken along an A-A line.
Figure 4B:
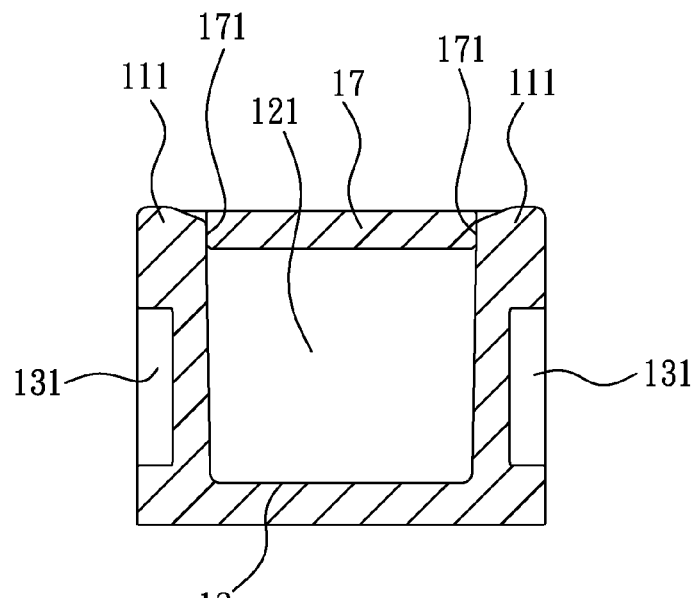
FIG. 4b is a cross sectional view of FIG. 3 taken along a B-B line.
Figure 5:
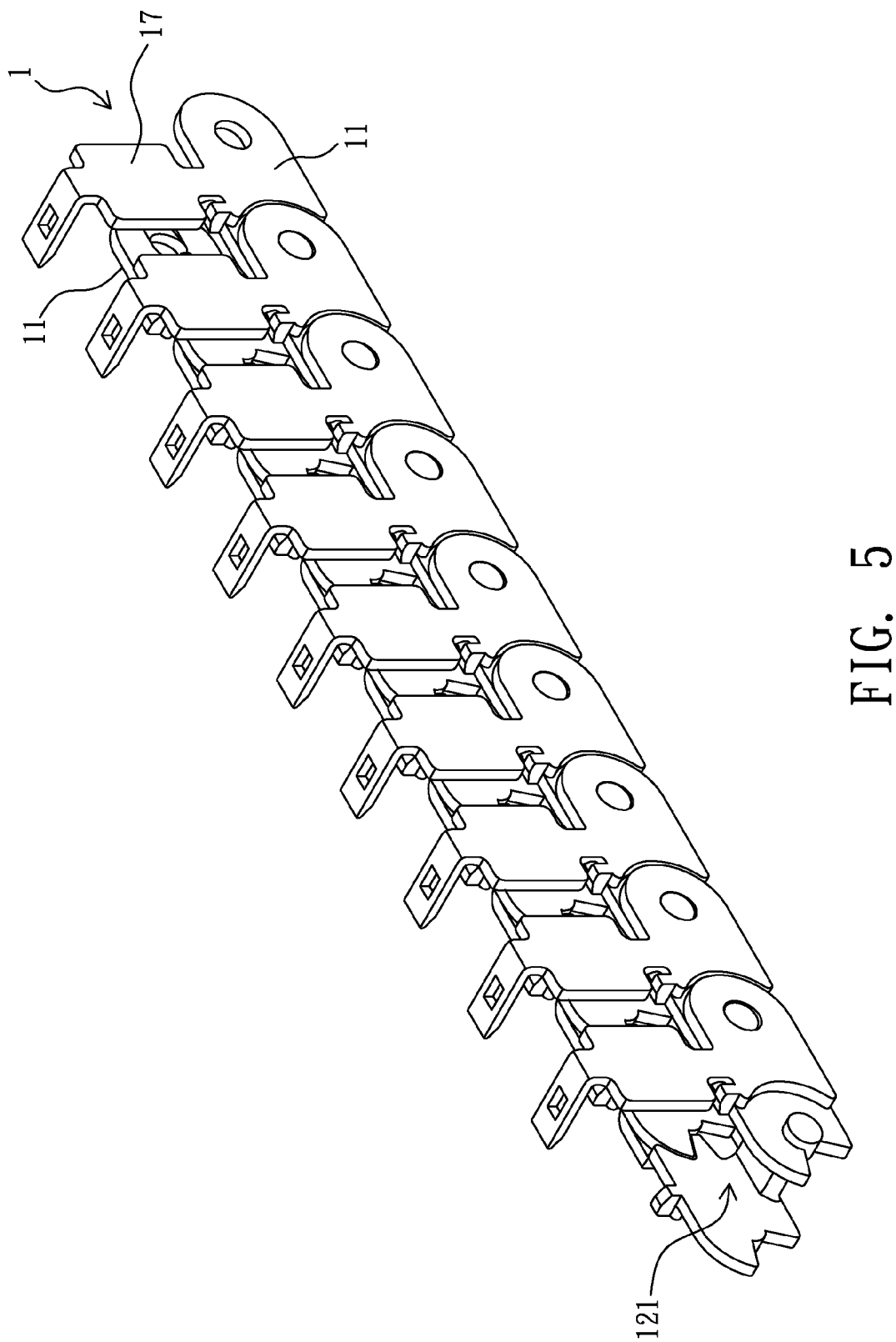
FIG. 5 is a schematic perspective view illustrating the guiding and protecting device being connected as a guiding chain, according to the present invention.
Figure 6:
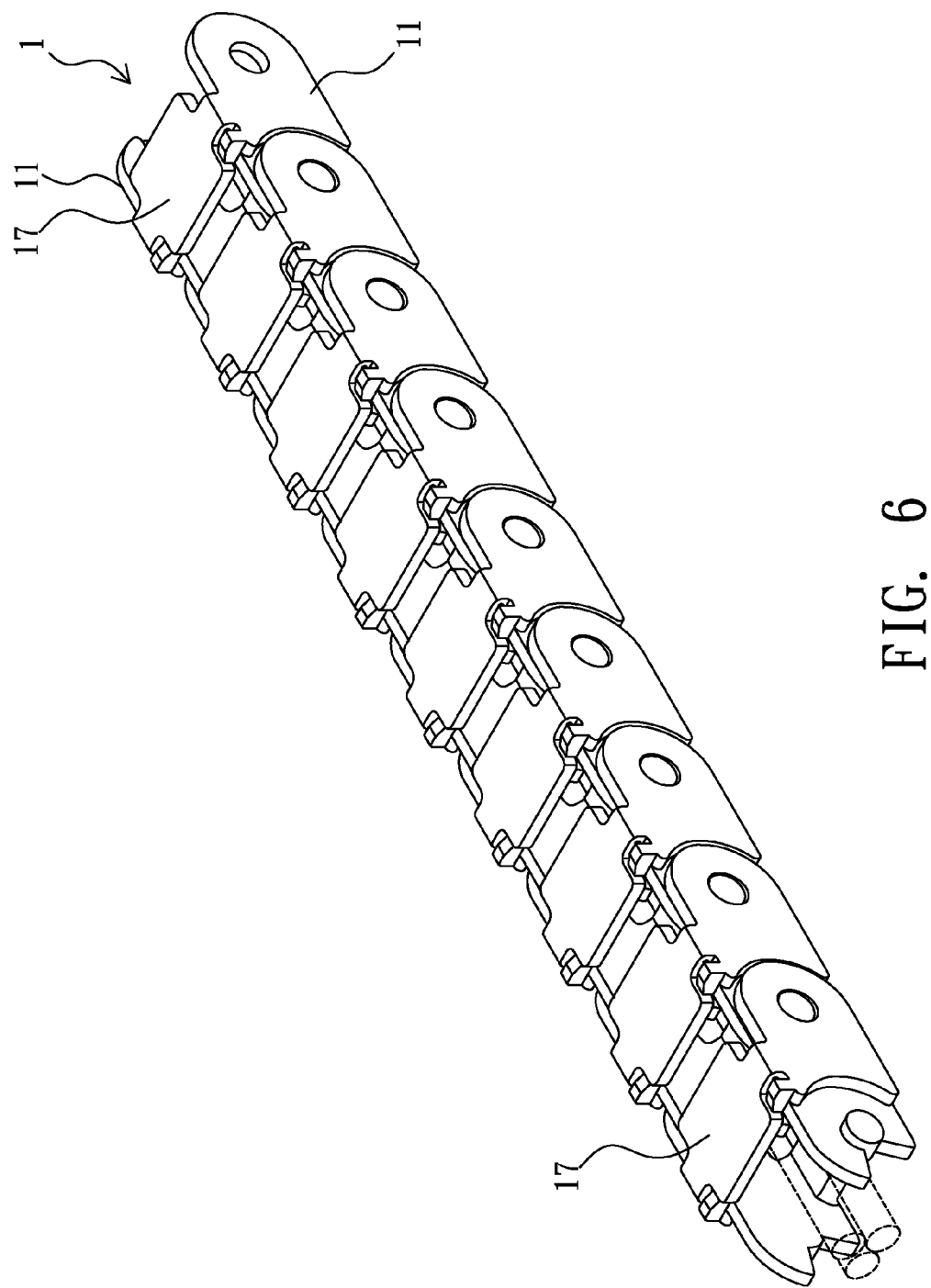
FIG. 6 is a schematic perspective view illustrating the restrain plate of the guiding chain shown in FIG. 5 being buckled.

The accompanying drawings are included to provide a further understanding of the invention, and are incorporated in and constitute a part of this specification. The drawings illustrate embodiments of the invention and, together with the description, serve to explain the principles of the invention, wherein FIG. 1 is a perspective exploded view showing the guiding and protecting device being viewed from one angle, according to the present invention; FIG. 2 is a perspective exploded view showing the guiding and protecting device being viewed from another angle, according to the present invention; FIG. 3 is a schematic perspective view illustrating the restrain plate of the guiding and protecting device being buckled, according to the present invention; FIG. 4*a* is a cross sectional view of FIG. 3 taken along an A-A line; FIG. 4*b* is a cross sectional view of FIG. 3 taken along a B-B line; FIG. 5 is a schematic perspective view illustrating the guiding and protecting device being connected as a guiding chain, according to the present invention; and FIG. 6 is a schematic perspective view illustrating the restrain plate of the guiding chain shown in FIG. 5 being buckled.

As shown from FIG. 1 to FIG. 4*b*, substantially the guiding and protecting device 1 provided by the present invention is integrally formed, e.g. an insulation frame formed through plastic injection molding.

The guiding and protecting device 1 has two lateral walls 11 symmetrically arranged with the bottoms connected by a bottom plate 12, thereby forming an accommodation slot 121 axially penetrated and having an opened top between the two lateral walls 11 and the bottom plate 12. Wherein, the outer side of the front portion of each lateral wall 11 is in sequence installed with a first recessed part 13 having a width half of the width of the lateral wall 11 and a first pivot plate 14, and an arc-shaped connection edge 131 is defined by each first recessed part 13 and the rear portion of the lateral wall 11, and each first pivot plate 14 is radially protruded with a pivot shaft 141, as shown in FIG. 4*a*, the free end of each pivot shaft 141 is formed as an inclined surface 142 having lower front and higher rear, and the bottom of each pivot shaft 141 and the front of the first pivot plate 14 are axially installed with a limitation mechanism, e.g. a limitation recessed slot 143 formed in a fan shape with a pre-determined angle.

The outer side of the rear portion of each lateral wall 11 is in sequence installed with a second pivot plate 15 having a width half of the width of the lateral wall 11 and a second recessed part 16, the rear of each second pivot plate 15 is formed with an arc-shaped flange 151 and radially formed with a shaft hole 152 allowing the pivot shaft 141 to be inserted, as shown in FIG. 4*a*, a guide slot 153 having higher front and lower rear is concavely formed between the longitudinally-taken tangent point of the diameter of each shaft hole 152 to the arc-shaped flange 151, and the front of the second recessed part 16 is axially installed with a limitation mechanism, e.g. a limitation claw 161 capable of being received in the limitation recessed slot 143.

In addition, the guiding and protecting device 1 further includes a restrain plate 17 having two lateral edges 171, wherein an end of one of the lateral edges 171 is integrally connected to the substantial center location of the top surface of one of the lateral walls 11 through a neck plate 172, thereby providing a bending function to the restrain plate 17, the other lateral edge 171 of the restrain plate 17 is downwardly extended with a bending part 173 having a buckle slot 174 of a buckle mechanism, and the other lateral wall 11 is formed with a buckle hook 175 corresponding to the location of the buckle slot 174. As shown in FIG. 1 and FIG. 3, the buckle hook 175 is preferably installed in a recessed slot 176 preformed on a vertical wall surface of the other lateral wall 11, so the bending part 173 of the restrain plate 17 can be accommodated in the recessed slot 176 and prevented from protruding out of the lateral wall 11. Moreover, at least one side of the top surfaces of the two lateral walls 11 are oppositely and protrudingly installed with a pair of positioning blocks 111 correspondingly to the two lateral edges 171 of the restrain plate 17, and the inner top surfaces of the pair of positioning blocks 111 are correspondingly formed with a pair of guide inclined surfaces 112.

As shown in FIG. 3, when the restrain plate 17 of the right lateral wall 11 of the guiding and protecting device 1 is downwardly bent and rotated, the neck plate 172 is firstly bent, and during the rotation process, the left and the right lateral edges 171 of the restrain plate 17 are downwardly and respectively moved along the guide inclined surfaces 112 of the left and the right positioning blocks 111 till the left and the right lateral edges 171 of the restrain plate 17 are respectively abutted against the inner edges of the left and the right positioning blocks 111 of the two lateral walls 11, and the buckle slot 174 of the bending part 173 is buckled with the buckle hook 175 formed in the vertical recessed slot 176 of the left lateral wall 11. As such, through the left and the right lateral edges 171 of the restrain plate 17 being respectively abutted against the inner edges of the left and the right positioning blocks 111 protrudingly formed on the top surfaces of the two lateral walls 11, the two lateral walls 11 are allowed to be in a parallel state in the vertical direction, thereby overcoming the disadvantage of two lateral walls 11 being inwardly retracted and deformed, meanwhile any lateral wall 11 is prevented from being deformed by an external impact, therefore the buckle connection between the restrain plate 17 and the lateral wall 11 is protected from being affected by the external force, thereby avoiding the occurrence of loosening or breaking and reinforcing the whole structural strength.

Referring to FIG. 4*a*, which is a cross sectional view of FIG. 3 taken along an A-A line. As shown in FIG. 4*a*, the free end of each pivot shaft 141 has the inclined surface 142 having lower front and higher rear, and a guide slot 153 having higher front and lower rear is concavely formed between the inner wall of the shaft hole 152 and the arc-shaped flange 151; with the designed guide mechanism, the inclined surfaces 142 of the pivot shafts 141 of two adjacent guiding and protecting devices 1 are facilitated to be moved along the guide slots 153 thereby smoothly guiding the pivot shafts 141 into the shaft holes 152, such that the two adjacent guiding and protecting devices 1 are allowed to be in a bendable state through the pivot shafts 141 being inserted in the shaft holes 152.

As shown in FIG. 4*b*, which is a cross sectional view of FIG. 3 taken along a B-B line. As shown in FIG. 4*b*, the restrain plate 17 of one of the lateral walls 11 is buckled with the other lateral wall 11 through a buckle mechanism, e.g. the buckle slot 174 and the buckle hook 175 which are oppositely arranged, so a cable or conduit received in the accommodation slot 121 defined between the two lateral walls 11 is restrained by the restrain plate 17 thereby being prevented from falling out. As a matter of fact, the buckle mechanism is not limited to what is disclosed in the embodiment, the buckle mechanism can also be protrudingly installed with a buckled hook on the inner wall of the bending part of the restrain plate, and concavely installed with a buckle slot on a vertical wall surface of the other lateral wall, wherein the buckle slot is installed in a recessed slot preformed on the vertical wall surface of the other lateral wall.

Referring to FIG. 1 and FIG. 2, a limitation mechanism is formed at the connection location defined by the shaft holes 152 and the pivot shafts 141 of two adjacent guiding and protecting devices 1, e.g. an interfere effect generated by the limitation recessed slot 143 of the first pivot plate 14 and the limitation claw 161 of the second recessed part 16, thereby limiting the bending angle of the two guiding and protecting devices 1.

Referring FIG. 5, which is a schematic perspective view illustrating plural guiding and protecting devices being connected as an elongated guiding chain through the assembly means disclosed above; the restrain plate 17 integrally extended from the top surface of one lateral wall 11 of each guiding and protecting device 1 is not buckled with the other lateral wall 11, thereby allowing the top of the accommodation slot 121 of each guiding and protecting device 1 to be in an opened state, and the cable or conduit can be provided and installed from the opened top of each accommodation slot 121, then the restrain plate 17 integrally extended from the top surface of one lateral wall 11 of each guiding and protecting device 1 is sequentially buckled with the other lateral wall 11 for sealing the opened top of the accommodation slot 121, thereby achieving the assembly shown in FIG. 6. Because the cable or conduit (shown as imaginary lines) is restrained by the restrain plate 17 of each guiding and protecting device 1, thereby being prevented from falling out, and achieving the objectives of guiding and protecting the cable or conduit.

Based on what is disclosed above, the present invention has following advantages: the guiding and protecting device utilizes the left and the right lateral edges of the restrain plate being respectively abutted against the inner edges of the left and the right positioning blocks protrudingly formed on the top surfaces of the two lateral walls, the two lateral walls are allowed to be in a parallel state in the vertical direction, thereby overcoming the disadvantage of two lateral walls being inwardly retracted and deformed, meanwhile any lateral wall is prevented from being deformed by an external impact, therefore the buckle connection between the restrain plate and the lateral wall is protected from being affected by the external force, thereby reinforcing the whole structural strength; the restrain plate is provided with features of breaking resistant and reusable, so the cable or conduit can be provided and installed from the top of the accommodation slot of the guiding and protecting device then buckling the restrain plate thereby allowing the operation of installing and assembling the cable or conduit with the guiding and protecting device to be smoothly processed.

In addition, with the design of the inclined surface of the pivot shaft and the guide mechanism of the guide slot laterally formed in the shaft hole, the assembly efficiency can be greatly increased and the labor and working hours can be saved.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A guiding and protecting device for a cable or conduit, comprising:
    a pair of lateral walls, the bottoms thereof being connected through a bottom plate thereby defining an accommodation slot having an opened top between said two lateral walls and said bottom plate, outer sides of the front portion and the rear portion of each lateral wall being in sequence installed with a first recessed part having a width half of the width of the lateral wall, a first pivot plate, a second pivot plate and a second recessed part; wherein an arc-shaped connection edge being defined by each first recessed part and the rear portion of said lateral wall thereby allowing to be adjacent to an arc-shaped flange formed at the rear portion of said second pivot plate, each first pivot plate being radially and protrudingly extended with a pivot shaft, and each second pivot plate being radially formed with a shaft hole allowing said pivot shaft to be inserted, and at least one side of the top surfaces of said pair of lateral walls being oppositely and protrudingly installed with a pair of positioning blocks; and
    a restrain plate having two lateral edges, wherein an end of one of said lateral edges being integrally connected to the top surface of one of said lateral walls through a neck plate, said other lateral edge being downwardly extended with a bending part, a buckle mechanism being formed between said bending part and said other lateral wall, when the buckling is finished, said two lateral edges of said restrain plate being respectively abutted against the inner edges of said positioning blocks protrudingly formed on the top surfaces of said two lateral walls, and the opened top of said accommodation slot being sealed by said restrain plate;
    wherein said buckle mechanism is formed with a buckle slot at said bending part of said restrain plate, and formed with a buckle hook on a vertical wall surface of said other lateral wall.

2. The guiding and protecting device for a cable or conduit as claimed a claim 1, wherein the inner top surfaces of said pair of positioning blocks are correspondingly formed with a pair of guide inclined surfaces.

3. The guiding and protecting device for a cable or conduit as claimed a claim 1, wherein said pivot shaft has an inclined surface having lower front and higher rear, and an guide slot having higher front and lower rear is concavely formed between said shaft hole to said arc-shaped flange for allowing said inclined surface of said pivot shaft to be aligned and guided.

4. The guiding and protecting device for a cable or conduit as claimed a claim 1, wherein said buckle hook is installed in a recessed slot preformed on said vertical wall surface of said other lateral wall.

5. The guiding and protecting device for a cable or conduit as claimed a claim 1, wherein the first pivot plate and the second recessed part further include a limitation mechanism, said limitation mechanism is axially installed with a fan-shaped limitation recessed slot with a predetermine angle at the bottom edge of each pivot shaft and the front of said first pivot plate; the front of said second recessed part is axially and protrudingly installed with a limitation claw capable of being received in said limitation recessed slot.

6. A guiding and protecting device for a cable or conduit, comprising:
    a pair of lateral walls, the bottoms thereof being connected through a bottom plate thereby defining an accommodation slot having an opened top between said two lateral walls and said bottom plate, outer sides of the front portion and the rear portion of each lateral wall being in sequence installed with a first recessed part having a width half of the width of the lateral wall, a first pivot plate, a second pivot plate and a second recessed part; wherein an arc-shaped connection edge being defined by each first recessed part and the rear portion of said lateral wall thereby allowing to be adjacent to an arc-shaped flange formed at the rear portion of said second pivot plate, each first pivot plate being radially and protrudingly extended with a pivot shaft, and each second pivot plate being radially formed with a shaft hole allowing said pivot shaft to be inserted, and at least one side of the top surfaces of said pair of lateral walls being oppositely and protrudingly installed with a pair of positioning blocks; and a restrain plate having two lateral edges, wherein an end of one of said lateral edges being integrally connected to the top surface of one of said lateral walls through a neck plate, said other lateral edge being downwardly extended with a bending part, a buckle mechanism being formed between said bending part and said other lateral wall, when the buckling is finished, said two lateral edges of said restrain plate being respectively abutted against the inner edges of said positioning blocks protrudingly formed on the top surfaces of said two lateral walls, and the opened top of said accommodation slot being sealed by said restrain plate;

wherein said buckle mechanism is protrudingly formed with a buckle hook on the inner wall of said bending part of said restrain plate, and concavely formed with a buckle slot on said vertical wall surface of said other lateral wall.

7. The guiding and protecting device for a cable or conduit as claimed a claim 6, wherein said buckle slot is installed in a recessed slot preformed on said vertical wall surface of said other lateral wall.

8. The guiding and protecting device for a cable or conduit as claimed a claim 6, wherein the inner top surfaces of said pair of positioning blocks are correspondingly formed with a pair of guide inclined surfaces.

9. The guiding and protecting device for a cable or conduit as claimed a claim 6, wherein said pivot shaft has an inclined surface having lower front and higher rear, and an guide slot having higher front and lower rear is concavely formed between said shaft hole to said arc-shaped flange for allowing said inclined surface of said pivot shaft to be aligned and guided.

10. The guiding and protecting device for a cable or conduit as claimed a claim 6, wherein the first pivot plate and the second recessed part further include a limitation mechanism, said limitation mechanism is axially installed with a fan-shaped limitation recessed slot with a predetermine angle at the bottom edge of each pivot shaft and the front of said first pivot plate; the front of said second recessed part is axially and protrudingly installed with a limitation claw capable of being received in said limitation recessed slot.

* * * * *